(12) United States Patent
Drennen et al.

(10) Patent No.: US 6,412,610 B1
(45) Date of Patent: Jul. 2, 2002

(54) ELECTRIC BRAKE CALIPER

(75) Inventors: David Bernard Drennen, Bellbrook; Gary Chris Fulks; Robert John Disser, both of Dayton, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/634,900

(22) Filed: Aug. 9, 2000

Related U.S. Application Data

(60) Provisional application No. 60/167,345, filed on Nov. 24, 1999.

(51) Int. Cl.[7] ............................................. F16D 65/21
(52) U.S. Cl. ....................... 188/156; 188/162; 188/72.1
(58) Field of Search ................................ 188/156, 157, 188/161, 162, 72.1

(56) References Cited

U.S. PATENT DOCUMENTS

| | | | |
|---|---|---|---|
| 4,793,447 A | * 12/1988 | Taig et al. | 188/156 |
| 4,804,073 A | 2/1989 | Taig et al. | 188/156 |
| 4,836,338 A | * 6/1989 | Taig | 188/156 |
| 4,850,457 A | * 7/1989 | Taig | 188/156 |
| 4,860,859 A | * 8/1989 | Yamatoh et al. | 188/156 |
| 6,139,460 A | * 10/2000 | Drennen et al. | 188/162 |
| 6,230,854 B1 | * 5/2001 | Schwarz et al. | 188/156 |
| 6,257,377 B1 | * 7/2001 | Schumann | 188/156 |

\* cited by examiner

*Primary Examiner*—Matthew C. Graham
(74) *Attorney, Agent, or Firm*—Robert M. Sigler

(57) ABSTRACT

The invention provides an electric brake caliper that includes a caliper housing have a rotor channel adapted to receive a rotor therein, where the rotor channel has a first axial surface adapted to seat an outer brake pad thereon. The brake caliper also includes a piston assembly mounted to the housing on an axial side of the rotor channel opposite that of the outer brake pad. The piston assembly includes: (a) a piston nut, reciprocatable towards and away from the rotor channel, where the piston nut is adapted to seat an inner brake pad thereon, (b) a cylindrical screw threaded into the piston nut, where the screw includes a coaxial, cylindrical bore extending therein, and (c) a planetary gear train positioned within the cylindrical bore of the screw, where the planetary gear train includes a motor-driven, central sun gear, at least one coaxial tube ring gear and at least one planetary pinion operatively engaged between the sun gear and the tube ring gear and carried on a revolving carrier, where the revolving carrier includes an output shaft extending therefrom, coaxial with, and coupled to the screw. The planetary pinion is axially slidable with respect to the tube ring gear such that any returning force applied by the inner brake pad against the planetary gear train of the piston assembly will be borne primarily by the tube ring gear, and thus, will not substantially adversely affect the operation of the planetary pinion and associated sun gear.

13 Claims, 5 Drawing Sheets

ELECTRIC BRAKE CALIPER

CROSS-REFERENCE TO RELATED APPLICATIONS

The sent application claims priority from U.S. Provisional Application No. 60/167,345, filed Nov. 24, 1999, the entire disclosure of which is incorporated herein by reference.

BACKGROUND OF THE INVENTION

The present invention relates to an electric brake caliper assembly for a vehicle, and more particularly, to an electric brake caliper with a highly efficient load-producing drive mechanism.

Various types of brake systems are known for use in automotive vehicles. Such brake systems include, for example, hydraulic brakes, anti-lock brakes and electric brakes. Electric brake systems (also referred to as "brake by wire" systems) utilize caliper mechanisms that incorporate an electric motor for driving a gear assembly positioned within the caliper housing, which, in turn, drives an inner brake pad against a brake rotor disc of a vehicle. A second, outer brake pad mounted to the caliper housing is positioned on an opposite side of the rotor disc. During braking, the inner brake pad is forced against the rotor disc and a resulting reactionary force pulls the outer break pad into engagement with the opposite side of the disc. Engagement of the inner and outer brake pads will slow or stop rotation of the rotor disc, and, in turn, slow the vehicle or hold, the vehicle in a fixed position.

A load sensor is typically positioned to detect the amount of force applied by the inner brake pad to the rotor disc. This load sensor is operatively coupled to a mechanism for controlling the position of the caliper housing, and in turn, the force applied by the outer break pad. Accordingly, this mechanism is used to equalize (or "center") the force applied by the two brake pads on the rotor disc.

A disadvantage with prior art electric brake calipers is that the design of such electric brake calipers requires that the reduction gears in the drive assembly bear an undesirable amount of the reactionary force from the inner brake pad during braking. If such reactionary force is borne by such reduction gears, it may have a tendency to adversely affect (i.e., "bog down") the operation of such reduction gears. Accordingly, there is a need for an electric brake caliper drive mechanism that minimizes the amount of the reactionary force borne by the reduction gears.

SUMMARY OF THE INVENTION

The present invention provides an electric brake caliper with a drive mechanism that minimizes the amount of reactionary force borne by the gear reducers in the drive mechanism. The drive mechanism is also designed to provide high loads with a substantially low pitch.

A first aspect of the present invention provides a brake caliper that includes a caliper housing having a rotor channel adapted to receive a rotor (such as a rotor disc) therein, where the rotor channel has a first axial surface adapted to seat an outer brake pad thereon. The brake caliper also includes a piston assembly mounted to the housing on an axial side of the rotor channel opposite that of the outer brake pad. The piston assembly includes: (a) a piston nut, reciprocatable towards and away from the rotor channel, where the piston nut is adapted to seat an inner brake pad thereon, (b) a cylindrical screw threaded into the piston nut, where the screw includes a coaxial, cylindrical bore extending therein, and (c) a planetary gear train positioned within the cylindrical bore of the screw, where the planetary gear train includes a motor-driven, central sun gear, at least one coaxial tube ring gear and at least one planetary pinion operatively engaged between the sun gear and the tube ring gear and carried on a revolving carrier, where the revolving carrier includes an output shaft extending therefrom, coaxial with, and coupled to the screw. The planetary pinion is axially slidable with respect to the tube ring gear such that any returning force applied by the inner brake pad against the planetary gear train of the piston assembly will be borne primarily by the tube ring gear, and thus, will not substantially adversely affect the operation of the planetary pinion and associated sun gear.

Preferably, the brake caliper also includes a force sensor positioned against a longitudinal end of the tube ring gear opposite that of the inner brake pad. This force sensor is adapted to be coupled to a conventional mechanism for controlling the position of the caliper housing, and in turn, the force applied by the outer brake pad.

The brake caliper also preferably includes a retaining flange extending radially inwardly from a longitudinal end of the piston nut, approximate the inner brake pad. The retaining flange prevents the cylindrical screw from traveling axially beyond a predefined point, thereby protecting the inner brake pad from damage caused by the cylindrical screw contacting the inner brake pad when the piston nut is returning to its home position after the brake caliper has applied a significant load against the rotor. It is also preferred that the inner brake pad includes a plurality of pins extending therefrom and received within the corresponding plurality of pin holes extending into the piston nut. This engagement of pins and pinholes prevents rotation (i.e., "cocking") of the piston nut during actuation of the brake caliper drive mechanism.

In another aspect of the present invention, a brake caliper includes a caliper housing having a rotor channel adapted to receive a rotor therein, where the channel has first axial surface adapted to seat an outer brake pad thereon. The brake caliper also includes a piston assembly mounted to the housing on an axial side of the rotor channel, opposite that of the outer brake pad. The piston assembly includes (a) a piston nut, reciprocatable towards and away from the rotor channel, where the piston nut is adapted to seat an inner brake pad thereon, (b) a cylindrical screw threaded into the piston nut, where the screw includes a coaxial, cylindrical bore extending therein, and (c) a planetary gear train positioned within the cylindrical bore of the screw. The planetary gear train includes: (1) a first motor-driven sun gear, (2) a tube ring gear coaxial with the first sun gear, (3) a first-stage planetary pinion engaged between the first sun gear and the tube ring gear, (4) a revolving stage separator coaxial with the first sun gear and carrying the first planetary pinion for rotation on a radially distal rotational axis, where the stage separator includes a second sun gear extending therefrom, the second sun gear being coaxial with the first sun gear, (4) a second planetary pinion engaged between the second sun gear and the tube ring gear, and (6) a revolving carrier coaxial with the first and second sun gears and carrying the second planetary pinion for rotation on a radially distal rotational axis. The revolving carrier includes a drive shaft extending therefrom, coaxial with the first and second sun gears, and the drive shaft is coaxially coupled to the cylindrical screw; thereby, rotationally driving the cylindrical screw, which, in turn, axially drives the piston nut towards or away from the rotor disc in the rotor channel.

Preferably, the planetary gear train includes three of the first-stage planetary pinions and three of the second-stage planetary pinions, all of which are uniformly distributed about the circumference of their respective sun gears. It is also preferred that the gear train also includes a first trio of washers respectively provided axially between the first-stage planetary pinions and the stage separator, and a second trio of washers respectively provided axially between the second-stage planetary pinions and the revolving carrier. Such washers are provided to reduce wear in the planetary gear train by reducing friction between the planetary pinions and the respective stage separator or carrier. It is also preferred that the planetary gear train also includes an annular washer provided axially between the second-stage planetary pinions and the stage separator, where the annular washer is coaxial with the drive gear. This annular washer is provided to reduce wear between the orbiting second-stage pinions and the revolving stage separator.

Accordingly, it is an object of the present invention to provide a drive mechanism for an electric brake caliper in which the reactionary force applied by the inner brake pad is not borne by the gear reducers therein. It is an object of the present invention to provide a drive mechanism for an electric brake caliper in which wear is reduced in the components of the gear reducer mechanism. It is an object of the present invention to provide an electric brake caliper in which "cocking" is reduced between the inner brake pad and the piston of the drive mechanism. It is also an object of the present invention to provide an electric brake caliper in which the drive mechanism includes a ball screw and nut assembly, where the ball screw component of the ball screw and nut assembly is prevented from contacting the inner brake pad when the ball screw and nut assembly is returning to its home position after the brake caliper has applied a significant load against the rotor disc. These and other objects of the present invention will be apparent from the following description, the appended claims and the attached drawings.

DESCRIPTION OF THE PREFERRED EMBODIMENT

Figure 1:
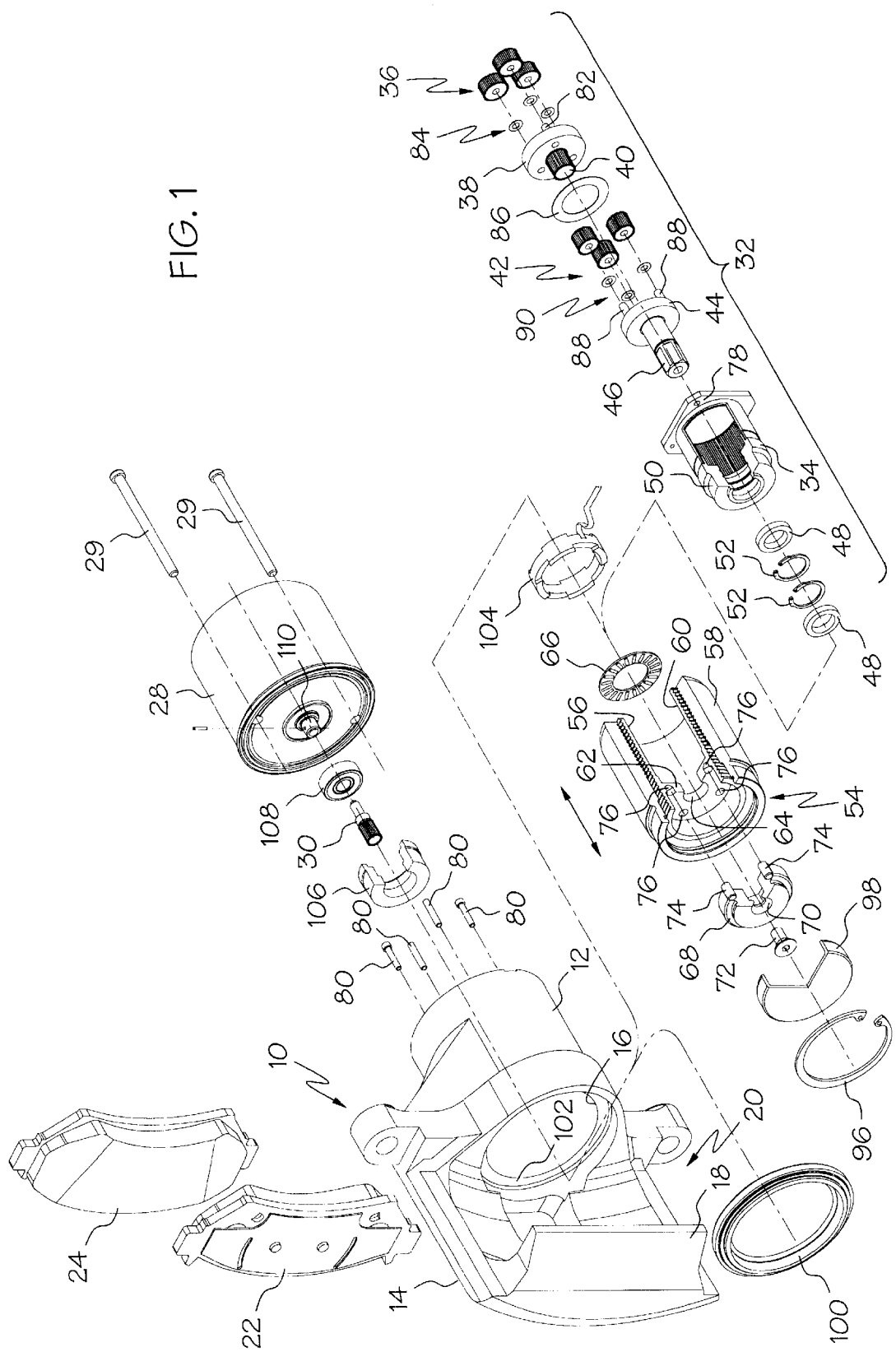
FIG. 1 is an exploded view of an electric brake caliper according to a preferred embodiment of the present invention.
Figure 2:
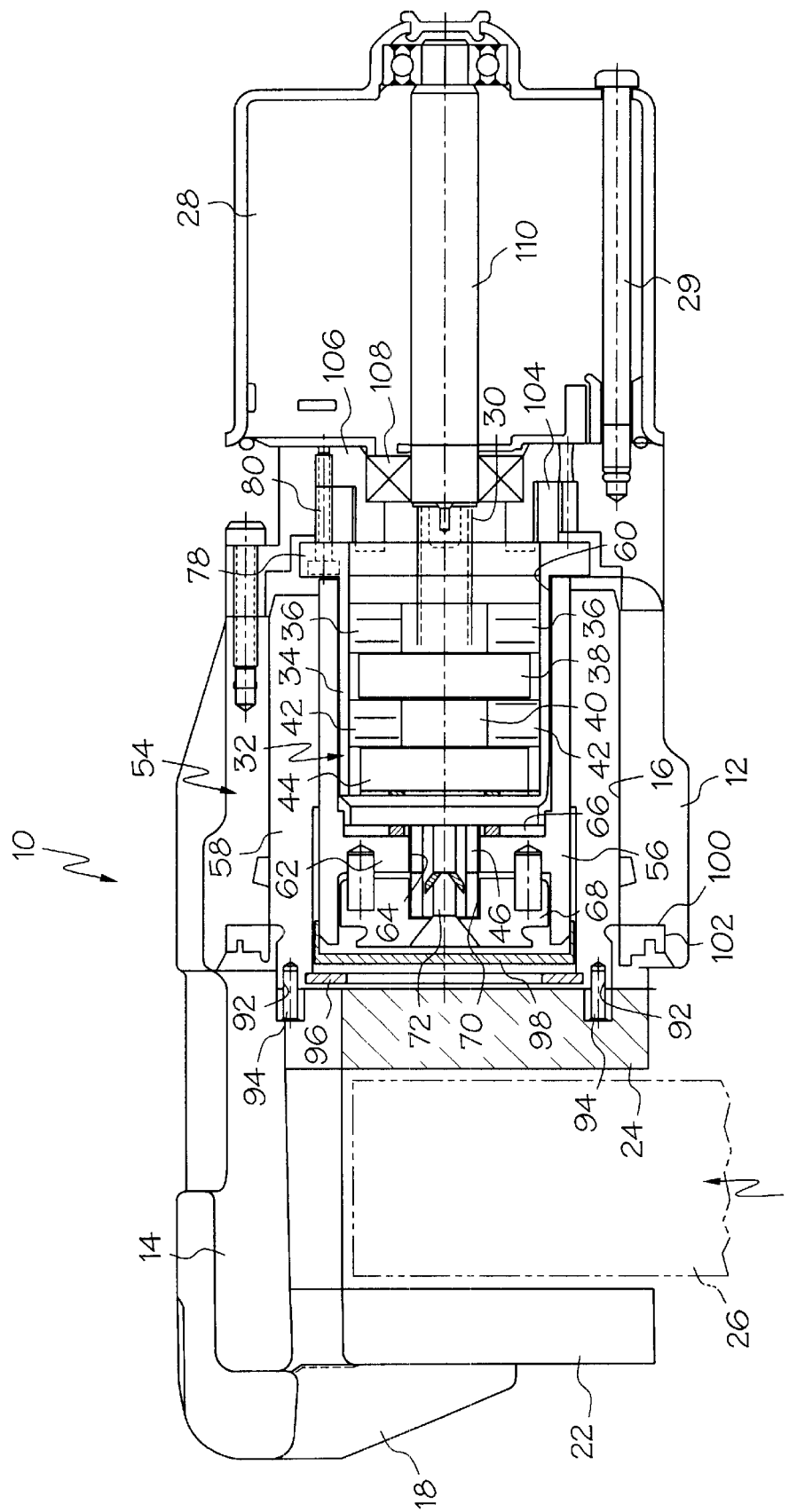
FIG. 2 is a cross-sectional view of the electric brake caliper of FIG. 1.
Figure 3:
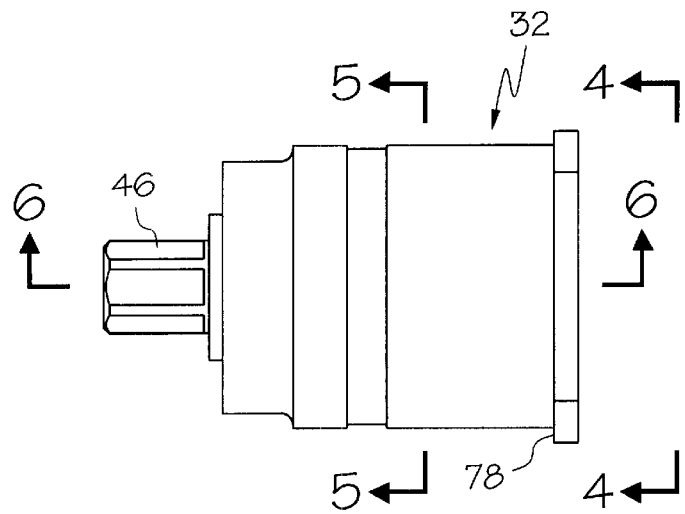
FIG. 3 is an elevational side view of the planetary gear train assembly according to a preferred embodiment of the present invention.
Figure 4:
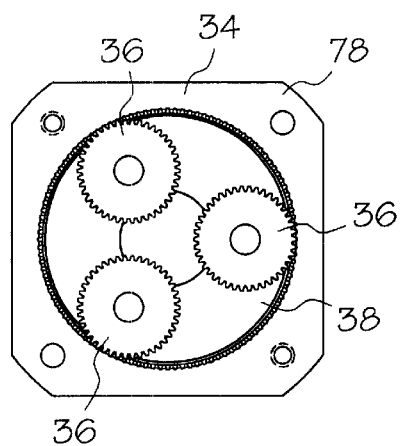
FIG. 4 is a longitudinal end view of the planetary gear train assembly of the preferred embodiment.
Figure 5:
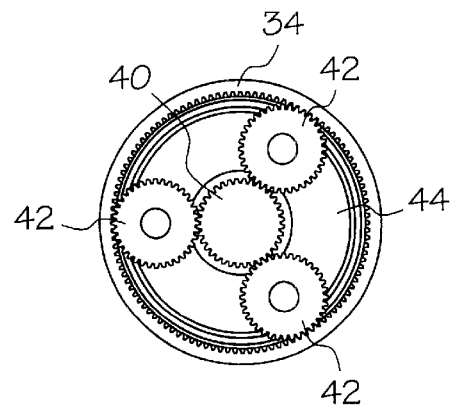
FIG. 5 is a cross-sectional view of the planetary gear train assembly of FIG. 3, taken along lines 5—5.

As shown in FIGS. 1 and 2, the electric brake caliper according to a preferred embodiment of the present invention includes a brake caliper housing 10 having a cylindrical housing portion 12 and an L-shaped bridge portion 14 extending axially from the cylindrical housing portion 12. The cylindrical housing portion 12 includes a cylindrical bore 16 extending therein for containing the drive mechanism of the electric brake caliper as will be described in detail below. The L-shaped bridge portion 14 of the caliper housing includes a flange 18 extending therefrom to form a rotor channel 20 axially between the flange 18 and the cylindrical housing portion 12. The flange 18 seats an outer brake pad 22 of conventional design thereon. An inner brake pad 24 is mounted to a drive assembly for axial reciprocation towards and away from the rotor channel 20, such that when the drive assembly is actuated, the inner brake pad 24 will be forced against a rotor disc 26 extending into the rotor channel 20.

As shown in FIGS. 1–6, the drive assembly includes a 12-volt motor 28 rotationally driving a sun gear 30 extending therefrom. The sun gear 30 is engaged with a planetary gear train 32 that includes a tube ring gear 34 coaxial with the sun gear 30, a trio of first-stage planetary pinions 36 engaged between the sun gear 30 and the tube ring gear 34, a revolving stage separator 38 carrying the first-stage planetary pinions for rotation on radially distal rotational axes. The stage separator 38 includes a sun gear 40 extending axially therefrom and coaxial with the motor driven sun gear 30. A second trio of planetary pinions 42 are engaged with the sun gear 40 between the sun gear 40 and the tube ring gear 34. A revolving carrier 44 carries the second-stage trio of planetary pinions 42 on radially distal rotational axes and includes a drive shaft 46 extending axially therefrom, where the drive shaft 46 is coaxial with the sun gears 30, 40. The drive shaft 46 is journaled by bearings 48 which are seated within a non-threaded cylindrical extension 50 of the tube ring gear 34. The bearings 48 are held in place within the extension 50 by retaining rings 52.

Referring primarily to FIGS. 1 and 2, the drive mechanism of the electric brake caliper according to the preferred embodiment also includes a ball screw and nut assembly 54 having a ball screw component 56 and a ball nut component 58. The ball nut component seats the inner brake pad 24 thereon, thereby acting as the piston of the electric brake caliper drive mechanism. The ball screw component 56 includes a cylindrical bore 60 extending therein for receiving the planetary gear train 32. An annular wall 62 projects radially inwardly from the cylindrical bore 60, approximate a longitudinal end of the screw component 56 near the inner brake pad 24. The annular wall 62 includes a central bore 64 extending therethrough for allowing the drive shaft to pass therethrough. An annular thrust bearing 66 is provided axially between the annular wall 62 and the longitudinal end of the extended cylindrical portion 50 of the tube ring gear 34.

The output shaft 46 of the planetary gear train 32 is coupled to the ball screw component 56 for simultaneous rotation. The coupling involves a drive disc 68 positioned on an outer axial side of the annular wall 62 opposite that of the planetary gear train 32 and includes a central bore 70 for receiving the drive shaft 46 therein. A screw 72 couples the drive shaft 46 into this central bore 70 of the drive disc 68. A plurality of pins 74 extending axially from the drive disc 68 are received within respective pinholes 76 extending into the outer axial surface of the annular wall 62.

The tube ring gear 34 includes a flange 78 extending from its inner longitudinal end, which is used to attach the tube ring gear 34 within the cylindrical bore 16 of the caliper housing 10 by screws 80. Accordingly, in operation, motor driven rotation of the sun gear 30 imparts rotation to the ball screw component 56, which, in turn, causes the ball nut component 58 to travel axially towards or away from the rotor grove 20, depending upon the direction of rotation of the sun gear 30. When the sun gear 30 is rotationally driven in a first direction, the inner brake pad 24 carried on the ball nut component 58 is forced against the rotor disc 26.

Figure 6:
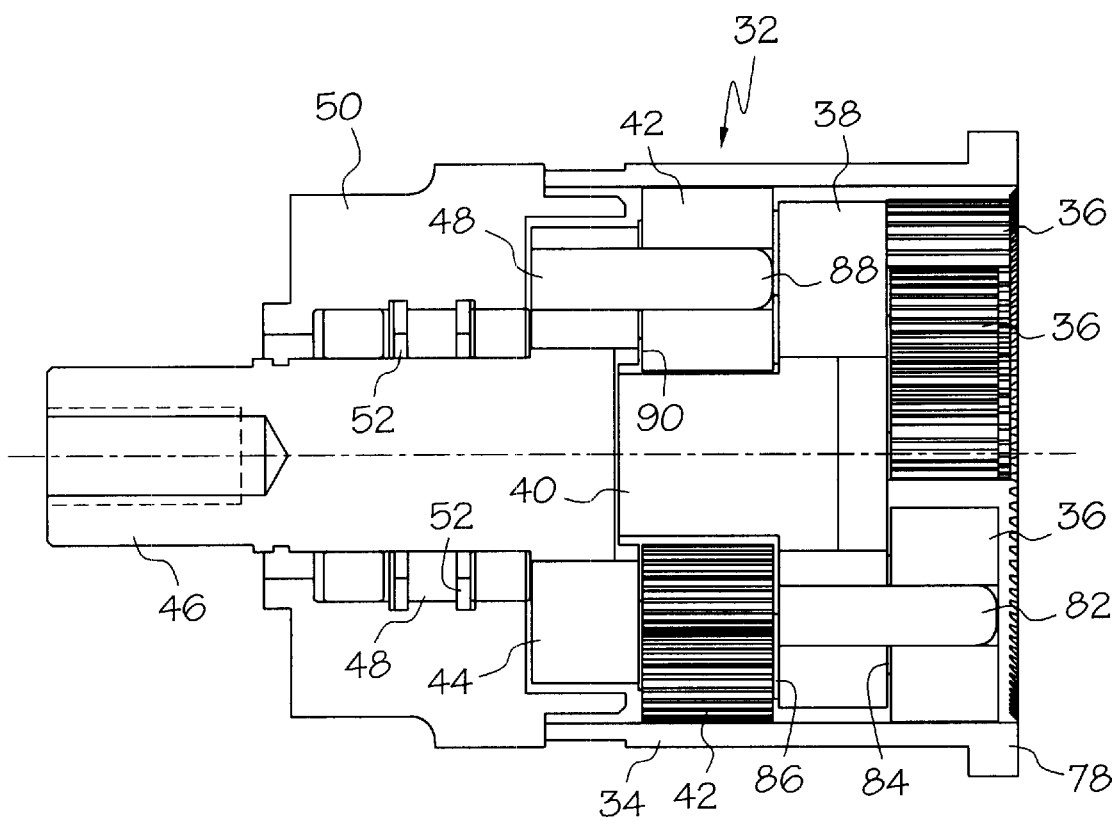
FIG. 6 is a cross-section view of the planetary gear train assembly of FIG. 3, taken along lines 6—6.

Referring primarily to FIGS. 1 and 6, the stage separator 38 includes three pin bearings 82 for respectively carrying the three planetary pinions 36 thereon. Additionally, three gear washers 84 are respectively positioned on the three pin bearings 82, axially between the planetary pinions 36 and the stage separator 38. An annular washer 86 is provided axially between the stage separator 38 and the three second-stage planetary pinions 42. The carrier 44 also includes three pin bearings 88 extending axially therefrom for respectively carrying the three second-stage planetary pinions 42 thereon. Additionally, three gear washers 90 are respectively positioned on the pin bearings 88 axially between the carrier 44 and the three second-stage planetary pinions 42. Gear washers 84, 90 are provided to reduce wear in the planetary gear assembly by reducing friction between pinions 36, 42 and the respective stage separator or carrier 38, 44. The annular stage washer 86 is provided to reduce wear between the orbiting planetary pinions 42 and the stage separator 38.

As shown primarily in FIGS. 1 and 2, the outer, longitudinal end surface of the ball nut component 58 of the ball screw and nut assembly 54 includes a plurality of pin holes for engagement with a respective plurality of pins 94 extending from the inner brake pad 24. Such pins and pinholes 92, 94 are provided to prevent rotation ("cocking") of the ball nut component 58 of the ball screw and nut assembly 54 during actuation of the brake caliper.

As shown primarily in FIGS. 1 and 2, a retaining ring 96 is mounted within the inner circumferential surface of the ball nut component 58 of the ball screw and nut assembly 54, approximate the second brake pad 24. This retaining ring 96 provides a retaining flange that prevents the ball screw component 56 of the ball screw and nut assembly 54 from traveling axially beyond the retaining 96. Without such a retaining ring 96, the inertia experienced by the ball nut component 58 when returning to the home position, after the brake caliper has applied a significant load against the rotor disc 26, may sometimes cause the screw component 56 to extend axially outward from the outer end of the ball nut component 58 and contact the inner brake pad 24.

A grease seal cap 98 is press fit over the outer longitudinal end of the ball screw component 56 of the ball screw and nut assembly 54 and a boot seal 100 is seated in an annular groove of the caliper housing 10 approximate the mouth of the inner cylindrical bore 16 opening onto the rotor groove 20. This boot seal 100 provides a seal between the caliper housing 10 and the reciprocating ball nut component 58.

With the design of the planetary gear train assembly 32, discussed above, the planetary pinions 36, 42 are permitted to slide axially within the tube ring gear 34. Accordingly, reactionary force applied by the inner brake pad 24 to the drive mechanism during actuation of the caliper will be borne primarily by the tube ring gear housing 34, and will thus not have a substantial adverse effect on the operation of the planetary gear train 32. A force sensor 104 is positioned axially between the inner longitudinal end of the tube ring gear housing 34 and an annular end cap 106 press fit over the bearings 108 journalling the drive shaft 120 of the motor 28. This force sensor 104 is operatively coupled to a control mechanism (not shown) used to control the position of the caliper housing with respect to the vehicle, and in turn, the force applied by the outer brake pad 22. Thus, this mechanism is used to equalize (or "center") the force applied by the two brake pads 22, 24 on the rotor disc 26.

Figure 7:
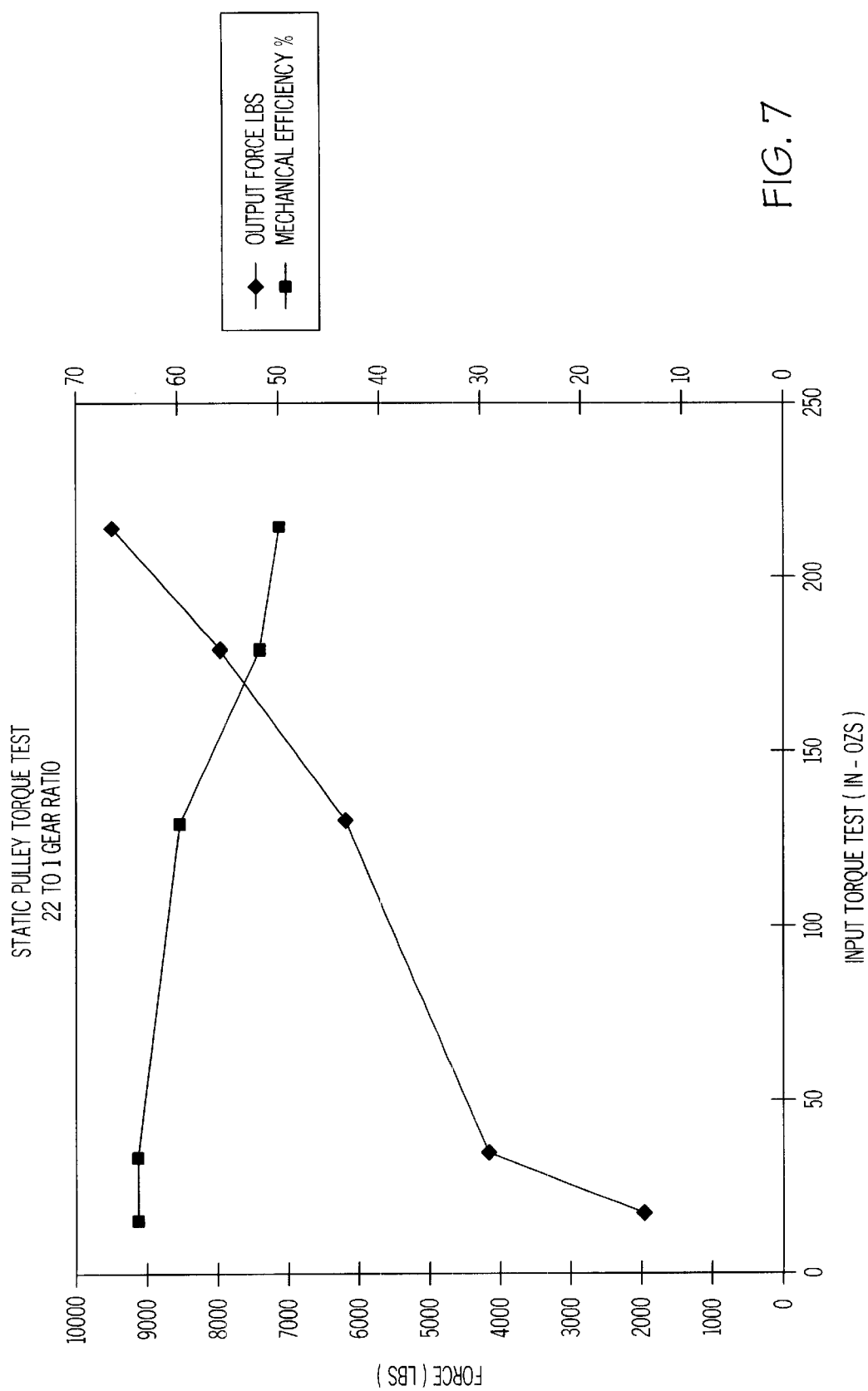
FIG. 7 is an output force and mechanical efficiency chart according to test results for a prototype brake caliper according to an embodiment of the present invention.

In the preferred embodiment, the first-stage planetary pinions 36 are 42-tooth pinions engaged with the 24-tooth sun gear 30, and the second-stage planetary pinions 42 are 36-tooth pinions engaged with the 36-tooth sun gear 40. The tube ring gear is 108-tooth ring gear having a 38.5 mm inner diameter. Referring to FIG. 7, this design of the planetary gear train assembly 32 provides up to 14,000 pound loads with a 0.098 pitch.

What is claimed is:

1. A brake caliper comprising:

a caliper housing including a rotor channel adapted to receive a rotor therein, the rotor channel having a first axial surface adapted to seat a first brake pad thereon; and a piston assembly mounted to the housing on an axial side of the rotor channel, the piston assembly including, a piston nut, reciprocatable towards and away from the rotor channel opposite that of the first brake pad, the piston nut adapted to seat a second brake pad thereon, a cylindrical screw threaded into the piston nut, the screw including a coaxial, cylindrical bore extending therein, and a planetary gear train positioned within the cylindrical bore of the screw, the planetary gear train including a motor-driven, central sun gear, at least one coaxial tube ring gear and at least one planetary pinion operatively engaged between the sun gear and the tube ring gear and carried on a revolving carrier, the revolving carrier including an output shaft extending therefrom, coaxial with, and coupled to the screw;

wherein the planetary pinion is axially slidable with respect to the tube ring gear.

2. The brake caliper of claim 1, further comprising a force sensor positioned against a longitudinal end of the tube ring gear opposite the second brake pad.

3. The brake caliper of claim 1, further comprising a retaining flange extending radially inwardly from a longitudinal end of the piston nut approximate the second brake pad, the retaining flange preventing the cylindrical screw from traveling axially beyond a predefined point, thereby protecting the second brake pad from damage caused by the cylindrical screw contacting the second brake pad.

4. The brake caliper of claim 1, wherein the second brake pad includes a plurality of pins extending therefrom and received within a corresponding plurality of pin-holes extending into the piston nut.

5. The brake caliper of claim 1, wherein the motor is an electric motor.

6. The brake caliper of claim 1, wherein the planetary gear train further includes:

a first plurality of planetary pinions engaged between the motor-driven sun gear and the tube ring gear;

a revolving stage separator carrying the first plurality of planetary pinions, the stage separator including a drive gear extending therefrom, the drive gear being coaxial with the motor-driven sun gear; and a second plurality of planetary pinions engaged between the drive gear and the tube ring gear;

wherein the revolving carrier carries the second plurality of planetary pinions.

7. The brake caliper of claim 6, wherein the planetary gear train further includes:

a first plurality of washers respectively positioned axially between the first plurality of planetary pinions and the stage separator; and a second plurality of washers respectively positioned axially between the second plurality of planetary pinions and the revolving carrier.

8. The brake caliper of claim 7, including an annular washer positioned axially between the second plurality of planetary pinions and the stage separator, the annular washer being coaxial with the drive gear.

9. The brake caliper of claim 1, wherein:

the cylindrical screw includes a wall extending radially into the cylindrical bore, near a longitudinal end of the cylindrical screw approximate the second brake pad, the wall including an axial hole receiving the drive shaft of the planetary gear train therethrough; and the piston assembly further includes a thrust bearing positioned within the cylindrical bore of the cylindrical screw, axially between the tube ring gear of the planetary gear train and the wall.

10. A brake caliper comprising:

a caliper housing including a rotor channel adapted to receive a rotor therein, the rotor channel having a first axial surface adapted to seat a first brake pad thereon;

a piston assembly mounted to the housing on an axial side of the rotor channel opposite that of the first brake pad, the piston assembly including, a piston nut, reciprocatable towards and away from the rotor channel, the piston nut adapted to seat a second brake pad thereon, a cylindrical screw threaded into the piston nut, the screw including a coaxial, cylindrical bore extending therein, and a planetary gear train positioned within the cylindrical bore of the screw, the planetary gear train including a motor-driven, central sun gear, at least one coaxial tube ring gear and at least one planetary pinion operatively engaged between the sun gear and the tube ring gear and carried on a revolving carrier, the revolving carrier including an output shaft extending therefrom, coaxial with, and coupled to the screw; and a retaining flange extending radially inwardly from a longitudinal end of the piston nut approximate the second brake pad, the retaining flange preventing the cylindrical screw from traveling axially beyond a predefined point, thereby protecting the second brake pad from damage caused by the cylindrical screw contacting the second brake pad.

11. A brake caliper comprising:

a caliper housing including a rotor channel adapted to receive a rotor therein, the rotor channel having a first axial surface adapted to seat a first brake pad thereon; and a piston assembly mounted to the housing on an axial side of the rotor channel opposite that of the first brake pad, the piston assembly including, a piston nut, reciprocatable towards and away from the rotor channel, the piston nut adapted to seat a second brake pad thereon, a cylindrical screw threaded into the piston nut, the screw including a coaxial, cylindrical bore extending therein, and a planetary gear train positioned within the cylindrical bore of the screw, the planetary gear train including, (a) a first motor-driven, sun gear, (b) a tube ring gear coaxial with the first sun gear, (c) a first-stage planetary pinion engaged between the first sun gear and the tube ring gear, (d) a revolving stage separator coaxial with the first sun gear and carrying the first planetary pinion for rotation on a radially distal rotational axis, the stage separator including a second sun gear extending therefrom, the second sun gear being coaxial with the motor-driven sun gear, (e) a second planetary pinion engaged between the second sun gear and the tube ring gear, and (f) a revolving carrier coaxial with the first and second sun gears and carrying the second planetary pinion for rotation on a radially distal rotational axis, the carrier including a drive shaft extending therefrom, coaxial with the first and second sun gears, the drive shaft being coaxially coupled to the cylindrical screw.

12. The brake caliper of claim 11, wherein:

the first sun gear is a 24-tooth sun gear;

the first-stage planetary pinion is a 42-tooth pinion;

the second sun gear is a 36-tooth sun gear; and the second-stage planetary pinion is a 36-tooth pinion.

13. The brake caliper of claim 12, wherein the planetary gear train includes three of the first-stage planetary pinions and three of the second-stage planetary pinions.

* * * * *